United States Patent
McCleary et al.

(10) Patent No.: US 9,388,643 B1
(45) Date of Patent: Jul. 12, 2016

(54) HARSH ENVIRONMENT PRESSURE COMPENSATOR FOR INLINE CABLE TERMINATION

(71) Applicant: Teledyne Instruments, Inc., Thousand Oaks, CA (US)

(72) Inventors: Alan McCleary, St. Augustine, FL (US); Justin Kretschmar, Port Orange, FL (US); Kaley Mishler, Ocoee, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 14/594,983

(22) Filed: Jan. 12, 2015

(51) Int. Cl.
*E21B 17/02* (2006.01)
*E21B 7/12* (2006.01)

(52) U.S. Cl.
CPC .................................. *E21B 17/028* (2013.01)

(58) Field of Classification Search
CPC .............. H01R 13/523; G02B 6/3816; H01L 2924/0002; E21B 17/1035; E21B 17/028
USPC ........................ 166/338, 341, 360, 311, 85.1; 137/15.04, 15.05, 15.06
See application file for complete search history.

(56) References Cited

U.S. PATENT DOCUMENTS

| | | | |
|---|---|---|---|
| 4,039,242 A | 8/1977 | Wilson et al. | |
| 4,616,900 A | 10/1986 | Cairns | |
| 4,682,848 A | 7/1987 | Cairns et al. | |
| 4,795,359 A | 1/1989 | Alcock et al. | |
| 4,948,377 A | 8/1990 | Cairns | |
| 5,194,012 A | 3/1993 | Cairns | |
| 5,772,457 A * | 6/1998 | Cairns ................. | H01R 13/523 439/201 |
| 5,838,857 A | 11/1998 | Niekrasz | |
| 6,315,461 B1 | 11/2001 | Cairns | |
| 6,736,545 B2 | 5/2004 | Cairns et al. | |
| 7,695,301 B2 | 4/2010 | Mudge, III et al. | |

OTHER PUBLICATIONS

Dr. James Cairns, "Wiriting the Next Chapter", Sea Technology, Jul. 1997, US.

* cited by examiner

*Primary Examiner* — James G Sayre
(74) *Attorney, Agent, or Firm* — Duncan Galloway Egan Greenwald, PLLC; Kevin T. Duncan (57) ABSTRACT

The present invention generally relates to an inline pressure compensator that compensates for volumetric changes within Field-Assembled Cable Termination (FACT) structures when exposed to high pressures and extreme subsea depths by transferring a pressure compensating fluid into the internal cavity of the FACT. The present invention may comprise a flexible internal component and an outer shell-like component. The inner component may comprise two concentric rings of edge-welded bellows that are joined together and wrapped around inner components of the termination or of the inner portion of the outer component. The inner void in the bellows may be filled with pressure-compensating fluid. The pressure compensating fluid diffuses directly into the fluid-filled cavity of the termination assembly. The exterior component may comprise a housing adapted to protect the interior bellows component and provide for seawater to fill the space around the periphery of the bellows arrangement.

18 Claims, 4 Drawing Sheets

HARSH ENVIRONMENT PRESSURE COMPENSATOR FOR INLINE CABLE TERMINATION

FIELD OF THE INVENTION

The present invention generally relates to subsea connector assemblies and more particularly to connector assemblies of the pressure compensated type. The present invention also relates to compensating pressure in volumes of fluid having been compressed or decompressed by changes in external hydrostatic pressure.

BACKGROUND OF THE INVENTION

In various undersea operations, especially in connection with undersea oil or gas wells, operational and monitoring equipment requires electrical and/or optical connection to various equipment. Such equipment can for instance be a flow meter for monitoring the flow of hydrocarbons in a pipe, a temperature gauge, a pressure gauge, etc. Such connections may also be needed in order to actively control equipment such as valves, or control devices such as microcontrollers.

In offshore drilling and production operations, equipment are often subjected to harsh conditions thousands of feet under the sea surface with working temperatures of −50° F. to 350° F. with pressures of up to 15,000 psi. Subsea control and monitoring equipment commonly are used in connection with operations concerning the flow of fluid, typically oil or gas, out of a well. Flow lines are connected between subsea wells and production facilities, such as a floating platform or a storage ship or barge. Subsea equipment include sensors and monitoring devices (such as pressure, temperature, corrosion, erosion, sand detection, flow rate, flow composition, valve and choke position feedback), and additional connection points for devices such as down hole pressure and temperature transducers. A typical control system monitors, measures, and responds based on sensor inputs and outputs control signals to control subsea devices. For example, a control system attached to a subsea tree controls down-hole safety valves. Functional and operational requirements of subsea equipment have become increasingly complex along with the sensing and monitoring equipment and control systems used to insure proper operation.

To connect the numerous and various sensing, monitoring and control equipment necessary to operate subsea equipment, harsh-environment connectors are used with electrical cables, optical fiber cables, or hybrid electro-optical cables. Initial demand for subsea connector development was in connection with military applications. Over time demand for such connectors has grown in connection with offshore oil industry applications.

Submersible electrical connectors may be of the dry-mate type or the wet-mate type. Dry-mate connectors cannot be mated while underwater, but rather must be mated before they are submerged. Wet-mate connectors can be mated and demated while underwater. Wet-mate connectors may use a simple interference-fit sealing mechanism that includes elastomeric seals. The elastomeric seats substantially force the water out of the contact area and seal the contact area from the outside environment. Other wet-mate connectors may use a dielectric fluid-filled chamber. The chamber, which is in the female or receptacle side of the connector, is penetrated by plug pins having insulated shafts, which are in the plug or male side of the connector. The purpose of these sealed, fluid-filled connectors is to insulate the electrical junctions from the outside environment by enclosing them within a chamber, or chambers, of dielectric fluid. These fluid-filled connectors offer many advantages over the other types. They are spark-proof, and therefore can be mated and demated with the receptacle electrically energized; however, it is generally not recommended that connectors be mated or de-mated while electrically energized. They include the additional safety feature that if the connector plug is inadvertently disconnected from the receptacle while the receptacle is energized, or if a circuit is accidentally energized in the unmated condition, they remain "dead-faced" to the outside environment, preventing short circuits. A large body of existing art is exemplified by U.S. Pat. Nos. 5,772,457, 5,194,012 and 4,948,377, issued to Cairns; U.S. Pat. No. 4,795,359, issued to Alcock; and U.S. Pat. No. 4,039,242, issued to Wilson.

Early underwater connectors were electrical "dry-mate" devices, intended to be mated prior to immersion in the sea and were of two principal types: rubber-molded "interference fit" type and rigid-shell connectors. The rubber molded "interference-fit" connectors depended on receptacles with elastic bores that stretched and sealed over mating plugs. The rigid-shell connectors had mating parts sealed together via O-rings or other annular seals.

Ocean Design, Inc. has been an industry leader in the development of subsea connectors and applications. Dr. James Cairns' article Hybrid Wet-Mate Connectors: 'Writing the Next Chapter', Sea Technology, published July 1997, provides a thorough discussion of the history of underwater connectors through to 1997, and is a source for this background summary. In the early 1960s, electrical connectors intended for mating and de-mating underwater came into use. These so called "wet-mate" connectors were adaptations of the interference-fit dry-mate versions, and were designed so that when mated, the water contained in the receptacle bores would be substantially expelled prior to sealing. Also during this time, the first oil-filled and pressure-balanced electrical connector designs were introduced. These isolated the receptacle contacts within sealed oil-chambers which, during engagement, were penetrated by elongated pins with insulated shafts. Connection was, therefore, accomplished in the benign oil, not in harsh seawater. Unlike previous connector types which could not be disengaged at even modest depths, pressure balancing type connectors could be actuated anywhere in the sea. These wet-mate oil-filled connectors eventually became the high-reliability standard for the offshore oil industry. One critical design element of oil-filled connectors is providing seals that allow the oil chambers to be penetrated repeatedly without losing the oil or allowing seawater intrusion. One design widely used for electrical applications accomplishes this through the use of dielectric pistons, one of which resides in each receptacle socket. Each piston has a spring which biases it outward to automatically fill the socket's end-seal when the plug pin is withdrawn. During mating the pins push these pistons back through the oil-chamber ports (which they have kept sealed) and onward deep inside the sockets.

Early subsea wet-mate optical connectors passed only one optical circuit and used expanded-beam lenses or fiber-to-fiber physical contact junctions. To protect the optical interfaces, both the plug and receptacle contacts were housed in oil-filled chambers which were pressure balanced to the environment. Problems with this design included that sealing and cleanliness were not adequate to provide desired reliability. The spring/piston concept used for sealing electrical connectors is not effective for optical connectors as pistons get in the way of the light path. A second type of subsea-mateable optical connector consisted basically of dry-mate connectors which had a bit of optical index-matching gel placed in the contact interfaces. The excess gel was expelled upon mating. There was no attempt to exclude sand or silt from the interfaces, and the resulting performance was left to chance. Hybrid wet-mate devices were an attempt to combine oil-filled and pressure-balanced plug and receptacle housings with means for sealing and maintaining cleanliness of the optical interfaces. Within both, plug and receptacle, oil chambers, groups of contact junctions are aligned behind cylindrical rubber face-seals. When mated, opposed plug and receptacle seals first press against each other like the wringers of an old-fashioned washing machine, forcing the water out from between them. As the mating sequence continues the opposed plug and receptacle seals, like the wringers, roll in unison and transport any debris trapped between them off to the side. The action simultaneously causes clean, sealed, oil-filled passages to open between opposed plug and receptacle contact junctions. Continuing the mating process, plug pins advance through the sealed passages to contact sockets within the receptacle. De-mating is the reverse sequence. In the case of electrical circuits each mated pin/socket junction is contained in an individual, secondary, sealed oil chamber within the common oil volume. The contacts are unexposed to environmental conditions before, during and after mating.

There are many types of connectors for making electrical and fiber-optic cable connections in hostile or harsh environments, such as undersea or submersible connectors which can be repeatedly mated and de-mated underwater at great ocean depths. Current underwater connectors typically comprise releasably mateable plug and receptacle units, each containing one or more electrical or optical contacts or junctions for engagement with the junctions in the other unit when the two units are mated together. Each of the plug and receptacle units or connector parts is attached to cables or other devices intended to be joined by the connectors to form completed circuits. To completely isolate the contacts to be joined from the ambient environment, one or both halves of these connectors house the contacts in oil-filled, pressure-balanced chambers—this is referred to as a pressure balanced set-up. Such devices are often referred to as "wet-mate" devices and often are at such great depths that temperature and other environmental factors present extreme conditions for materials used in such devices. The contacts on one side (plug) are in the form of pins or probes, while the contacts or junctions on the other side (receptacle) are in the form of sockets for receiving the probes.

Typically, the socket contacts are contained in a sealed chamber containing a dielectric fluid or other mobile substance, and the probes enter the chamber via one or more sealed openings. Such wet-mate devices have previously been pressure compensated. One major problem in designing such pressure compensated or pressure balanced units is the performance and longevity of seals required to exclude seawater and/or contaminates from the contact chamber after repeated mating and de-mating.

Both the plug and receptacle halves of most fiber-optical connectors which are mateable in a harsh environment have oil-filled chambers. The chambers are typically brought face-to-face during an early step of the mating sequence. In a subsequent mating step, one or more connective passages, sealed from the outside environment, are created between the chambers of the mating connector halves. The passages join the two oil-filled chambers, creating a single, connected oil volume. Actual connection of the contact junctions then takes place within the common oil chamber. Examples of prior pressure compensated wet-mate devices are described in U.S. Pat. Nos. 4,616,900; 4,682,848; 5,838,857; 6,315,461; 6,736,545; and 7,695,301.

In some known underwater electrical connectors, such as that described in U.S. Pat. No. 4,795,359 of Alcock and U.S. Pat. No. 5,194,012 of Cairns, tubular socket contacts are provided in the receptacle unit, and spring-biased pistons are urged into sealing engagement with the open ends of the socket assemblies. As the plug and receptacle units are mated, pins on the plug portion urge the pistons back past the contact bands in the sockets, so that electrical contact is made. However, this type of arrangement cannot be used in a straightforward way for an optical connector since the optical contacts must be able to engage axially for practical purposes.

U.S. Pat. No. 4,666,242 of Cairns describes an underwater electro-optical connector in which the male and female connector units are both oil filled and pressure balanced. This device utilizes a penetrable seal element having an opening which pinches closed when the units are separated and seals against the entering probe when mated. Other known fiber-optic connectors have similar seals which are not suitable for use under some conditions and may tend to lose effectiveness after repeated mating and de-mating.

Most existing wet-mate connectors of the pressure compensation-type depend on elastomers, which have several known disadvantages and which only grow as required temperature and pressure performance in the operating environments increase. Above 350° F. in particular, but at lower temperatures as well, elastomers in seawater degrade rapidly, and can fail due to numerous causes, including: rupture; rapid gas decompression (RGD) embolisms; leakage; melting; and gas permeation. Materials science has advanced to create new materials capable of functioning and lasting in harsher environments, but the industry is moving towards temperature regimes at or in excess of 400° F., where even the newest materials will be stressed to or beyond their limits.

Other pressure compensation systems typically rely on metal bellows, which have different weaknesses. At the scale of ever-smaller optical feedthrough systems, where diameters of compensation systems are typically less than an inch, the metal of the bellows are extraordinarily thin, and the welded joints may be subject to fatigue, opening up failure pathways similar to those of elastomers. One primary concern with deployable embodiments of wet-mate devices regarding pressure compensation is the use of elastomeric hoses. Operators experience signal loss on gas and gas-lift wells during start up and shutdown. At these events the gas functions in the well are dynamic and not at equilibrium. In addition, pressure compensated systems in gaseous environments have experienced complete loss of pressure compensation and infiltration of seawater into spaces that should be dielectrically insulated by oil.

Thus, common underwater connectors comprise releasably, mateable plug and receptacle units, each containing one or more electrical or optical contacts or junctions for engagement with the junctions in the other unit when the two units are mated together. The contacts on one side are in the form of pins or probes, while the contacts or junctions on the other side are in the form of sockets for receiving the probes. Typically, the socket contacts are contained in a sealed chamber containing a dielectric fluid or other mobile substance, and the probes enter the chamber via one or more sealed openings. One major problem in designing such units is the provision of seals which will adequately exclude or evacuate seawater and/or contaminants from the contact chamber after repeated mating and de-mating operations.

SUMMARY OF THE INVENTION

When exposing devices to extreme depths subsea, high pressures must be taken into consideration, especially when structures contain atmospheric cavities that could potentially compress under force.

Prior art methods to prevent damage under pressure include filling voids with pressure compensating fluids, which are nearly incompressible, in order to minimize the amount of compressible gas contained within. Adding a pressure compensating fluid to a void or cavity in the housing of a subsea device lessens the compressive effects of the outside pressures on the housing of the device. However, fluids are marginally compressible, and therefore shells and housings in prior art devices are typically very thick to withstand collapsing as the device is not truly pressure compensated.

The present invention comprises an inline pressure compensator that provides for pressure normalization of interior chambers in termination assemblies. The present invention has a rigid inline configuration to simplify exterior shape and assembly. The inline configuration also provides for coaxial pressure compensation without movement of internal termination elements.

The inline pressure compensator of the present invention compensates for volumetric changes within Field-Assembled Cable Termination (FACT) structures when exposed to high pressures and extreme subsea depths. The present invention may comprise an inner and an outer component: a flexible internal component, and an outer shell-like component. The inner component may comprise two concentric rings of edge-welded bellows that are joined together and wrapped around inner components of the termination or of the inner portion of the outer component. In prior pressure compensation designs have used devices such as rubber bladders and diaphragms to manipulate volumes within subsea devices, however a problem with such designs is that rubber and like materials are not as durable as metallic material, which can withstand a design life of 20 to 30 years. The inner void in the bellows may be filled with pressure-compensating fluid. The pressure compensating fluid diffuses directly into the fluid-filled cavity of the termination assembly. The exterior component may comprise a housing adapted to protect the interior bellows component and provide for seawater to fill the space around the periphery of the bellows arrangement. As pressure increases, the interior bellows component also compresses which injects the contained pressure compensating fluid into the termination cavity. The additional fluid transferred from the interior bellows component to the termination cavity compensates for the change in volume of the fluid in the termination cavity as a result of high hydrostatic pressures. The interior bellows element of the pressure compensator of the present invention expands and contracts coaxially, and the exterior shell remains rigid to maintain unchanging position of internal termination parts and an overall uniform shape.

In order to insure that the shell of the termination does not collapse due to the volume shrinkage of pressure-compensating fluid as a result of high hydrostatic pressures, the termination housing of prior art devices is typically designed to have a thick exterior. The interior cavity of the present invention is fully pressure-compensated and it is therefore no longer necessary to implement a thick shell. The fully pressure-compensated, thinner shelled termination assembly of the present invention has a reduced overall size and utilizes less material than prior art designs. The fully pressure-compensated interior of the present invention also reduces the possibility of stress cracks developing in the termination housing, through which water could possibly ingress and cause a failure to occur.

Prior art pressure-compensation systems and methods that are not fully pressure compensated also present the problem of cable intrusion. When the fluid in the interior of the termination assembly shrinks under high hydrostatic pressure, the external pressures may push the cable to which the termination is fixed into the unoccupied volume. With a fully pressure compensated termination, the unoccupied volume into which the cable would encroach is eliminated.

Furthermore, prior art pressure compensator designs have used such devices as pistons, bladders, and metallic bellows that are fixed transversely to the subsea device they are neutralizing. Such prior art assemblies occupy more space than necessary to account for the additional exterior fixtures as well as the potential range of expansion of the compensation device when experiencing changes in pressure. The rigid inline pressure compensator of the present invention minimizes the space occupied by the termination assembly itself and, with the immobility of the pressure compensator structure, eliminates additional space required for pressure compensation expansion. The inline design of the present invention provides increased reliability and simplifies the assembly process by implementing a stack-up procedure compared to the additional attachment of posterior parts required by the prior art devices.

In one embodiment, the present invention comprises an inline pressure compensator and cable termination assembly comprising: a field deployable cable termination device being generally cylindrical in shape and having: a set of at least one terminal extending the length of the cable termination device substantially along an axis; a fluid-filled internal cavity through which the set of at least one terminal extends; and a first end through which the set of at least one terminal extends; and a pressure compensator comprising a rigid external housing and an internal flexible component comprising a bellows portion, the rigid external housing adapted to substantially receive therein the bellows portion of the flexible internal component, the rigid external housing and the flexible internal component being adapted to be mounted on the cable termination device at the first end and being co-axial with the cable termination device axis to form an inline assembly; wherein the rigid external housing comprises a cylindrical body having an open-ended annular top portion, an inner wall, an outer wall, and a bottom, the inner wall and the outer wall being spaced apart and configured along with the top portion and the bottom to form an outer cavity and an inner cavity in the cylindrical body, the outer cavity being adapted to receive and substantially surround the bellows portion of the flexible internal component, the bottom and the inner cavity being adapted to receive the set of at least one terminal and to permit a connection of the set of at least one terminal, the outer wall of the body having a set of at least one opening adapted to permit ambient fluid to diffuse through the set of at least one opening and thereby expose the outer cavity and the bellows portion of the flexible internal component to ambient hydrostatic pressure; wherein the flexible internal component comprises a body portion having an internal cavity formed therein defined by a top and a cylindrical wall, the top being adjacent to the bottom of the rigid external housing and the internal cavity of the flexible internal component being disposed intermediate of the inner cavity of the rigid external housing and the cable termination device, the top and internal cavity of the flexible internal component being adapted to receive the set of at least one terminal therethrough, the bellows portion having a hollow interior formed therein containing a pressure compensating fluid and an output through which the pressure compensating fluid may flow, the flexible internal component further comprising a fluid channel in fluid communication with the output of the bellows portion and the internal cavity of the flexible internal component, and the internal cavity of the flexible internal component being in fluid communication with the fluid-filled internal cavity of the cable termination device; and wherein the bellows portion is adapted to compress upon experiencing increasing external hydrostatic pressure and to diffuse the pressure compensating fluid through the fluid channel and into the internal cavity of the flexible internal component when compressed to provide a pressure balanced environment within the pressure compensator and cable termination assembly.

The inline pressure compensator and cable termination of the above embodiment may further comprise, wherein the pressure compensator is adapted to compensate the pressure in an internal cavity of the cable termination assembly to prevent movement of the set of at least one terminal within the cable termination device. The bellows portion may further be adapted to expand under decreasing external hydrostatic pressure and to diffuse the pressure compensating fluid through the fluid channel into the interior of the bellows portion. The bellows portion may be made of metallic material and comprises an inner bellows ring and an outer bellows ring that are edge-welded together. The inline pressure compensator and cable termination assembly may further comprise a set of at least one o-ring seal device disposed intermediate the pressure compensator and the cable termination device. The exterior housing may comprise an annular base at the bottom and the flexible interior component comprises an annular support portion disposed intermediate of the annular base and the end of the cable termination device. The bottom of the exterior housing may include a first set of holes and the flexible interior component includes a second set of holes, the first and second sets of holes configured to be aligned when assembled and having dimension adapted to receive the set of at least one terminal. The cable termination device may be a receptacle and the inline pressure compensator and cable termination device is adapted to matingly receive a plug, and wherein the set of at least one terminal connects with a corresponding set of at least one terminal in the plug to form a connection. The cable termination device may be a plug and the inline pressure compensator and cable termination device is adapted to mate with a receptacle, and wherein the set of at least one terminal connects with a corresponding set of at least one terminal in the receptacle to form a connection.

In another embodiment, the present invention comprises a pressure compensator assembly adapted to mount on a cable termination device to form an inline assembly, the pressure compensator assembly comprising: an internal flexible component comprising a bellows portion; a rigid external housing adapted to substantially receive therein the bellows portion of the flexible internal component, the rigid external housing and the flexible internal component being adapted to be mounted on a cable termination device at a first end and being co-axial with a cable termination device axis to form an inline assembly; wherein the rigid external housing comprises a cylindrical body having an open-ended annular top portion, an inner wall, an outer wall, and a bottom, the inner wall and the outer wall being spaced apart and configured along with the top portion and the bottom to form an outer cavity and an inner cavity in the cylindrical body, the outer cavity being adapted to receive and substantially surround the bellows portion of the flexible internal component, the bottom and the inner cavity being adapted to receive a set of at least one terminal of the cable termination device, the outer wall of the body having a set of at least one opening adapted to permit ambient fluid to diffuse through the set of at least one opening and thereby expose the outer cavity and the bellows portion of the flexible internal component to ambient hydrostatic pressure; wherein the flexible internal component comprises a body portion having an internal cavity formed therein defined by a top and a cylindrical wall, the top being adjacent to the bottom of the rigid external housing and the internal cavity of the flexible internal component being disposed intermediate of the inner cavity of the rigid external housing and the cable termination device, the top and internal cavity of the flexible internal component being adapted to receive the set of at least one terminal therethrough, the bellows portion having a hollow interior formed therein containing a pressure compensating fluid and an output through which the pressure compensating fluid may flow, the flexible internal component further comprising a fluid channel in fluid communication with the output of the bellows portion and the internal cavity of the flexible internal component, and the internal cavity of the flexible internal component being in fluid communication with a cavity formed in the cable termination device; and wherein the bellows portion is adapted to compress upon experiencing increasing external hydrostatic pressure and to diffuse the pressure compensating fluid through the fluid channel and into the internal cavity of the flexible internal component when compressed to provide a pressure balanced environment within the pressure compensator and cable termination assembly.

The pressure compensator of the above embodiment may further comprise, wherein the pressure compensator is adapted to compensate the pressure in an internal cavity of the cable termination assembly to prevent movement of the set of at least one terminal within the cable termination device. The bellows portion may further be adapted to expand under decreasing external hydrostatic pressure and to diffuse the pressure compensating fluid through the fluid channel into the interior of the bellows portion. The bellows portion may be made of metallic material and comprises an inner bellows ring and an outer bellows ring that are edge-welded together. The pressure compensator may further comprise, a set of at least one o-ring seal device disposed intermediate the pressure compensator and the cable termination device. The exterior housing may comprise an annular base at the bottom and the flexible interior component comprises an annular support portion disposed intermediate of the annular base and the end of the cable termination device. The bottom of the exterior housing may include a first set of holes and the flexible interior component includes a second set of holes, the first and second sets of holes configured to be aligned when assembled and having dimension adapted to receive the set of at least one terminal. The cable termination device may be a receptacle and the inline pressure compensator and cable termination device is adapted to matingly receive a plug, and wherein the set of at least one terminal connects with a corresponding set of at least one terminal in the plug to form a connection. The cable termination device may be a plug and the inline pressure compensator and cable termination device is adapted to mate with a receptacle, and wherein the set of at least one terminal connects with a corresponding set of at least one terminal in the receptacle to form a connection.

In yet another embodiment, the present invention comprises a pressure compensation device comprising: a rigid external housing; and a flexible internal component having a pressure compensating means containing a compensating fluid; the rigid external housing adapted to receive and substantially surround the pressure compensating means of the flexible internal component and comprising: diffusion means adapted to permit an external fluid to pass into a portion of the housing to expose the pressure compensating means to an external hydrostatic pressure associated with the external fluid; the flexible internal component being disposed intermediate the rigid external housing and a cable termination device, wherein the pressure compensating means is adapted to compress under hydrostatic pressure to diffuse the compensating fluid contained in the pressure compensating means through a fluid distribution means; whereby the pressure compensation device is adapted to be attached to an end of a cable termination device to form an inline assembly with respect to an axis of the cable termination device, and wherein the fluid distribution means is in communication with a cavity formed in the cable termination device to cause the combined assembly to be pressure balanced.

The pressure compensation device of the above embodiment may further comprise, wherein the pressure compensating means is adapted to decompress under decreasing hydrostatic pressure to permit the pressure compensating fluid to diffuse into the pressure compensating means.

BRIEF DESCRIPTION OF THE DRAWINGS

In order to facilitate a complete understanding of the present invention, this system, and the terms used, reference is now made to the accompanying drawings, in which like elements are referenced with like numerals. These drawings should not be construed as limiting the present invention or system, but are exemplary and for reference.

DETAILED DESCRIPTION

The present invention and system will now be described in more detail with reference to exemplary embodiments as shown in the accompanying drawings. While the present invention and system is described herein with reference to the exemplary embodiments, it should be understood that the present invention and system is not limited to such exemplary embodiments. Those possessing ordinary skill in the art and having access to the teachings herein will recognize additional implementations, modifications, and embodiments as well as other applications for use of the invention and system, which are fully contemplated herein as within the scope of the present invention and system as disclosed and claimed herein, and with respect to which the present invention and system could be of significant utility.

The present invention generally relates to an inline pressure compensator that compensates for volumetric changes within Field-Assembled Cable Termination (FACT) structures when exposed to high pressures and extreme subsea depths by transferring a pressure compensating fluid into the internal cavity of the FACT. The present invention may comprise a flexible internal component and an outer shell-like component. The inner component may comprise two concentric rings of edge-welded bellows that are joined together and wrapped around inner components of the termination or of the inner portion of the outer component. The inner void in the bellows may be filled with pressure-compensating fluid. The pressure compensating fluid diffuses directly into the fluid-filled cavity of the termination assembly. The exterior component may comprise a housing adapted to protect the interior bellows component and provide for seawater to fill the space around the periphery of the bellows arrangement.

Figure 1:
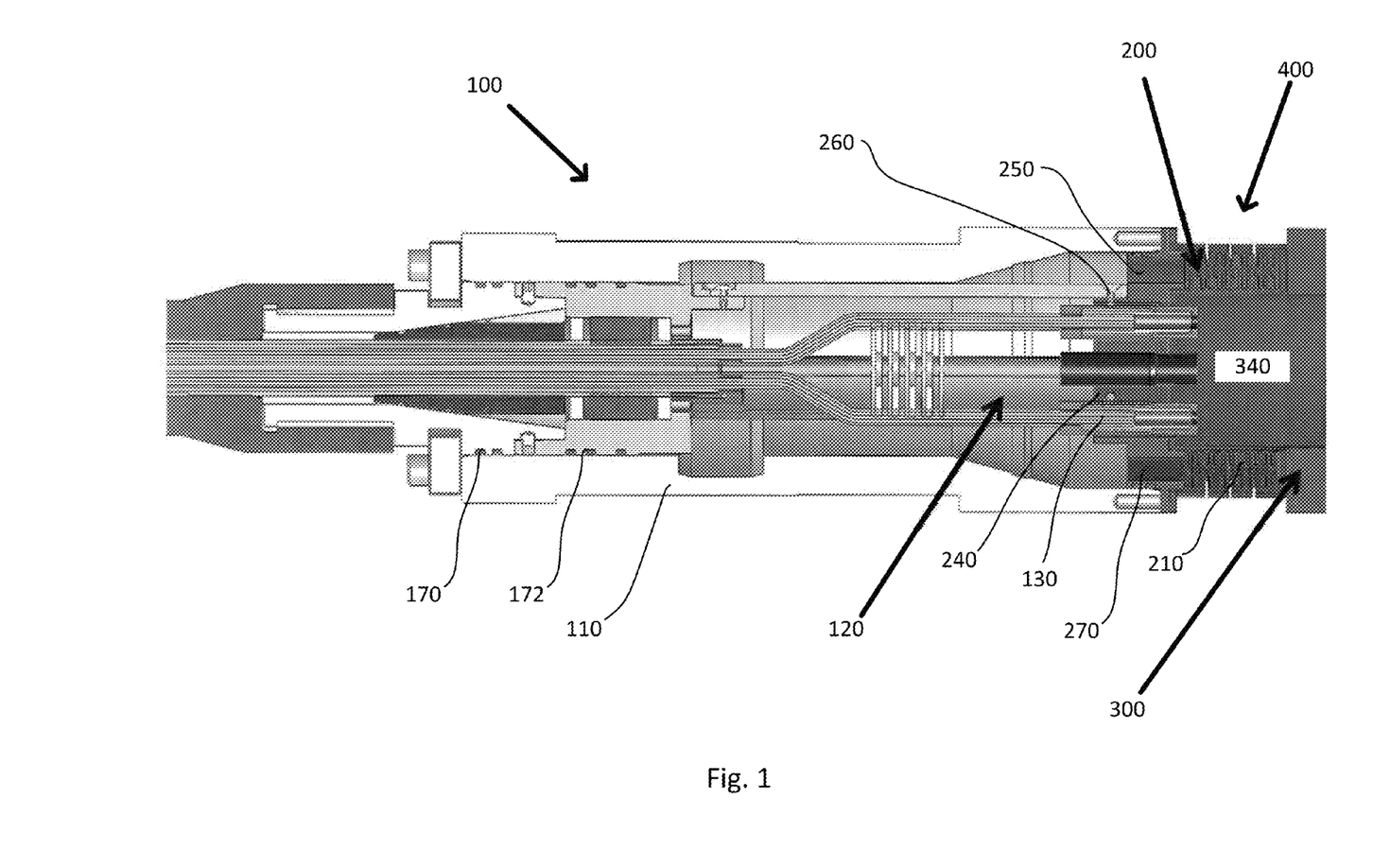
FIG. 1 provides a cross-section view of an embodiment of a FACT comprising an inline pressure compensator according to the present invention.

With reference to FIG. 1, a cross-section view of an embodiment of FACT 100 comprising a pressure compensator 400 according to the present invention is provided. The inline pressure compensator 400 of the present invention is adapted to fully pressure compensate the fluid-filled chamber or interior cavity 120 of the cable termination assembly or FACT 100. The pressure compensator is disposed on the end of the termination housing 110 having the termination elements 130. The termination elements 130 may be electrical, optical, or other connection terminations. The pressure compensator 400 comprises two components—a rigid exterior shell-like housing 300 and a flexible interior component 200. Fluid in the bellows 210 of the interior component 200 is transferred from the bellows 210 to the interior cavity 120 through pressure compensated fluid channels 270 and fluid transfer openings 260. The transfer of the fluid from the bellows 210 to the interior cavity 120 is caused by increasing hydrostatic pressures on the exterior of the bellows 210. The fluid transfer to the interior cavity 120 prevents the collapse of the termination housing 110 and also prevents the termination elements 130 from being forced into the exterior component core area or termination cavity 340 of pressure compensator 400 by high exterior hydrostatic pressures that may cause the fluid in the core area or termination cavity 340 to compress.

Figure 2:
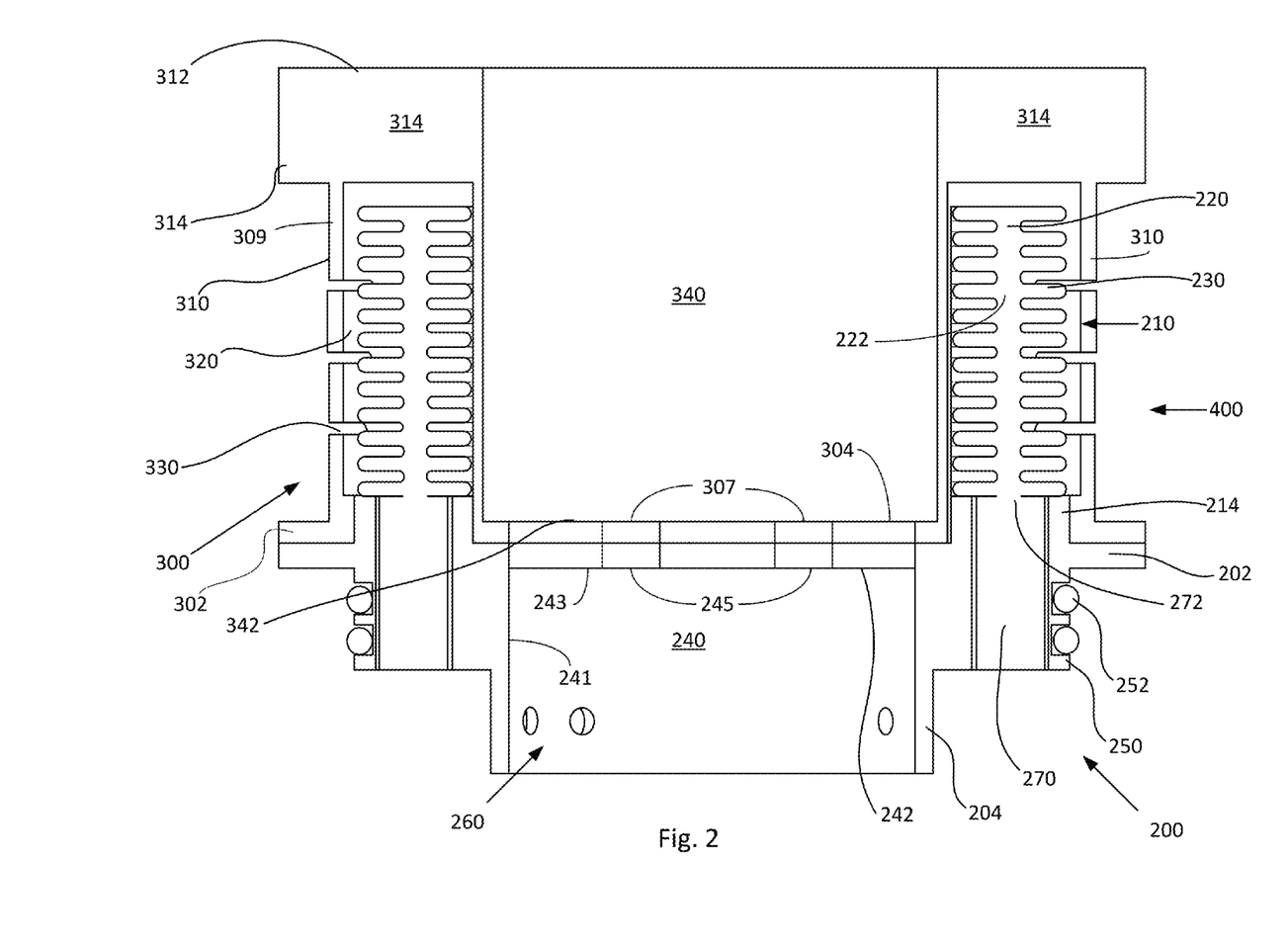
FIG. 2 provides a cross-section view of an embodiment of an inline pressure compensator comprising an interior component and exterior component according to the present invention.

The pressure compensator 400 may be disposed coaxially at the termination elements 130. The pressure compensator 400 is substantially ring-like in shape which allows for termination and cable elements such as termination elements 130 to pass through the interior component core area 240 and exterior component core area 340 as shown in FIG. 2. The exterior housing component 300 of the pressure compensator 400 is rigid, providing for the pressure-compensating bellows 210 of the interior component 200 to move within the exterior housing 300, while restricting movement of overall termination structures, such as termination elements 130 and termination housing 110, so that the space occupied by FACT 100 is constant. Termination elements 130 are fixed to the top and bottom or ends of FACT 100, and redundant o-ring rubber seals 170, 172, and 250 are used on either end of FACT 100 to prevent the ingress of undesired ambient water and debris into the interior 120 of FACT 100.

With reference to FIG. 2, a cross-section view of the inline pressure compensator 400 is shown comprising an interior component 200 and exterior component 300. The interior component 200 of the pressure compensator 400 comprises a bellows assembly 210 which comprises two concentric rings, inner bellows ring 220 and outer bellows ring 230, of edge-welded bellows joined proximally. The surrounding exterior of the bellows assembly 210 is exposed to seawater. Both the interior bellows ring 220 and exterior bellows ring 230 are mounted to a ringed or annular base 214. The void present in the interior of the bellows rings 220 and 230 is filled with a nearly incompressible fluid that directly diffuses into the fluid-filled chamber of the termination assembly 120 of FIG. 1. The fluid transfers through bellows fluid opening 272 to fluid transfer channel 270 and then through fluid transfer openings 260 in the collar 204 into the core area 240 formed by top 243 and cylindrical sidewall 241. Termination elements, such as termination elements 130 in FIG. 1, may pass through openings in the interior component core area top 242 and exterior component core area bottom 342. O-ring channels 250 in the flexible interior component 200 may receive one or more o-rings 252 to keep the external environment (e.g., seawater) from entering the interior of the FACT 100. The interior component base 202 abuts the exterior housing component base 302 and the end of the termination housing 110 and both the exterior component 300 and interior component 200 of the pressure compensator 400 may be secured to the FACT 100 by any suitable securing means.

The exterior component 300 of the pressure compensator 400 is fitted or otherwise disposed over the top of the bellows arrangement 210 of the interior component 200 and attached or fastened to the bellows base 214, thereby fully encasing the posterior and interior walls of the bellows component 210. The exterior component 300 includes an annular ring portion 314 and a base 302 with a body portion 310 intermediate of the end 314 and base 302. The body portion 310 includes an outer wall 309 and an inner wall 305 with a plurality of slotted holes or seawater openings 330 disposed on and about the body outer wall 309 to allow for the diffusion of seawater into the void 320 formed between the body outer wall 309 and the body inner wall 305. The void 320 is completely isolated from the internal chamber 120 of the FACT 100 as shown in FIG. 1. The exterior housing end ring 314 is open ended at end or top 312. The inner wall 305 and the bottom surface 304 of the exterior housing component 300 forms a cylindrically shaped volume or core 340 adapted to receive the corresponding connection component for the FACT 100. For example, bores 307 in the bottom 304 receive therein terminal members 130 as shown in FIG. 1. Similarly, terminal members 130 are received in bores 245 formed in the top 243 of interior component 200. The bellows 210 of the interior component 200 encircles the interior wall 305 of the core 340 and is surrounded by the outer wall 309 of the body 310 of the exterior component 300 of the pressure compensator 400.

Figure 3:
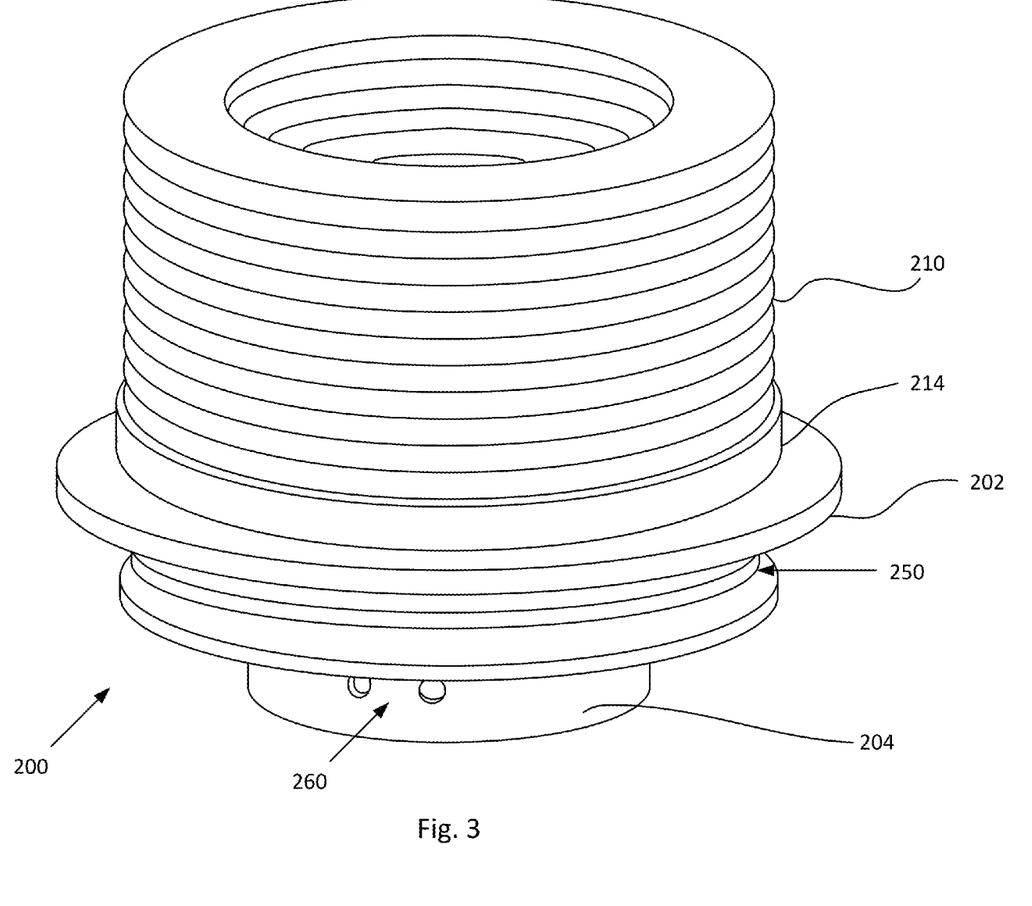
FIG. 3 provides a perspective view of an embodiment of a flexible interior component with bellows assembly according to the present invention.

With reference now to FIG. 3, a perspective view of an embodiment of a flexible interior component 200 with bellows assembly 210 is provided. The bellows assembly 210 is disposed on the top of the bellows base 214 which is disposed on the top of interior component base 202. The bellows assembly 210 compresses under hydrostatic pressures and forces a pressure compensating fluid contained in the bellows interior 222 out of the bellows assembly 210 through the fluid transfer channel 270 and into the interior cavity 120 of the FACT 100. The pressure compensating fluid passes through the fluid transfer openings 260 formed in the collar 204. The o-ring channels 250 are adapted to receive one or more o-rings 252, shown in FIG. 2, to keep seawater and other external debris from the internal cavity 120 of the FACT 100. The interior component 200 may be made of any corrosion-resistant metal, including but not limited to Inconel.

Figure 4:
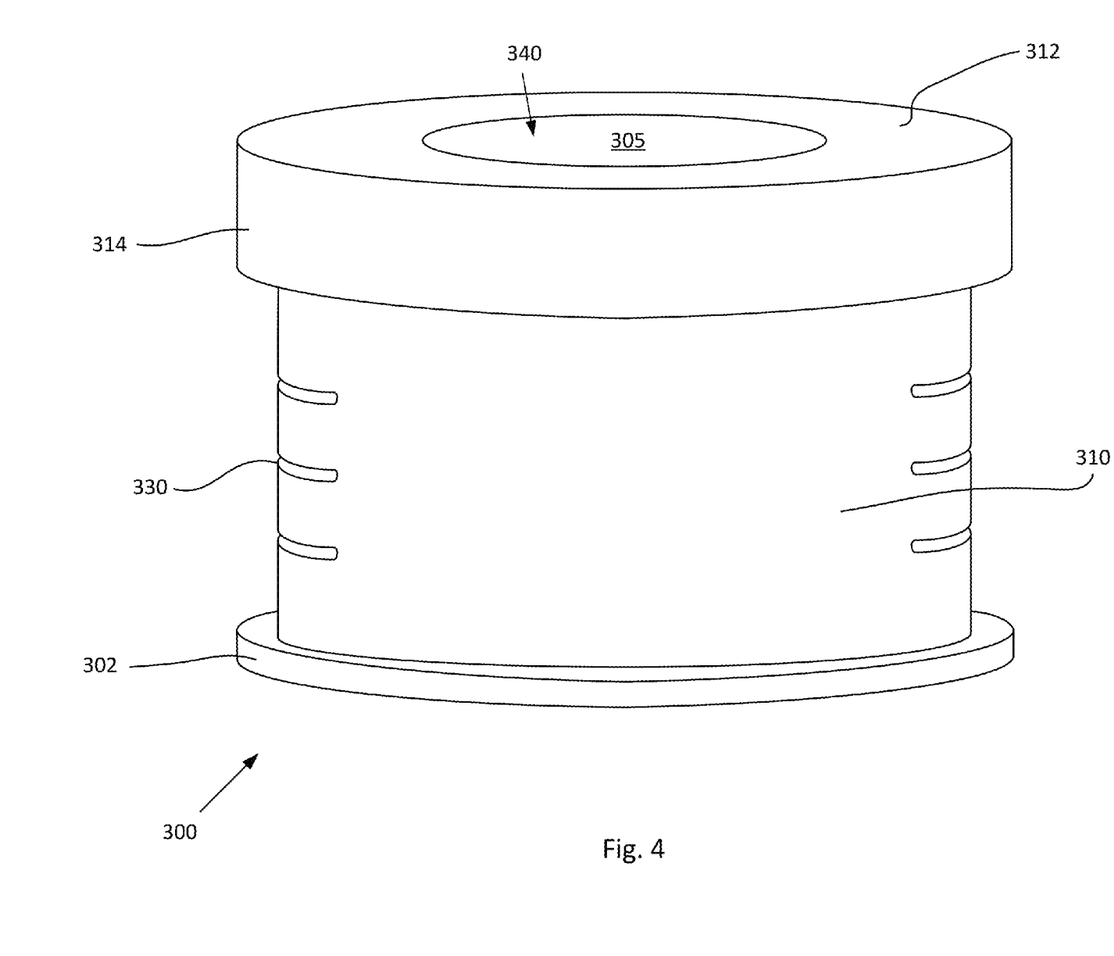
FIG. 4 provides a perspective view of an embodiment of a rigid exterior component according to the present invention.

With reference now to FIG. 4, a perspective view of an embodiment of a rigid exterior component 300 according to the present invention is provided. The exterior component 300 is a rigid housing having a base 302 and an end ring 314 with an intermediate body portion 310. The end or top 312 of the end ring 314 has an opening to the core area 340 formed by the interior wall 305 and bottom 304. The core area 340 is adapted to receive a corresponding cable to FACT 100. The body 310 of the exterior component 300 has a set of openings 330 formed in outer wall 309 and disposed about the exterior of the body 310. These openings 330 are adapted to let seawater diffuse into an interior void 320 of the exterior component 300 that surrounds the bellows 210 of the interior component 200. The seawater coming through the openings 330 increases the hydrostatic pressure on the bellows 210 thereby compressing the bellows 210 and causing the fluid contained therein to diffuse into the interior cavity 120 of the FACT 100. In this manner a true pressure compensated system is provided that avoids unwanted cable intrusion, shell collapse, and connector failures in an efficient, streamlined inline configuration.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

The invention claimed is:

1. An inline pressure compensator and cable termination assembly comprising:

a field deployable cable termination device being generally cylindrical in shape and having: a set of at least one terminal extending the length of the cable termination device substantially along an axis; a fluid-filled internal cavity through which the set of at least one terminal extends; and a first end through which the set of at least one terminal extends; and a pressure compensator comprising a rigid external housing and an internal flexible component comprising a bellows portion, the rigid external housing adapted to substantially receive therein the bellows portion of the flexible internal component, the rigid external housing and the flexible internal component being adapted to be mounted on the cable termination device at the first end and being co-axial with the cable termination device axis to form an inline assembly;

wherein the rigid external housing comprises a cylindrical body having an open-ended annular top portion, an inner wall, an outer wall, and a bottom, the inner wall and the outer wall being spaced apart and configured along with the top portion and the bottom to form an outer cavity and an inner cavity in the cylindrical body, the outer cavity being adapted to receive and substantially surround the bellows portion of the flexible internal component, the bottom and the inner cavity being adapted to receive the set of at least one terminal and to permit a connection of the set of at least one terminal, the outer wall of the body having a set of at least one opening adapted to permit ambient fluid to diffuse through the set of at least one opening and thereby expose the outer cavity and the bellows portion of the flexible internal component to ambient hydrostatic pressure;

wherein the flexible internal component comprises a body portion having an internal cavity formed therein defined by a top and a cylindrical wall, the top being adjacent to the bottom of the rigid external housing and the internal cavity of the flexible internal component being disposed intermediate of the inner cavity of the rigid external housing and the cable termination device, the top and internal cavity of the flexible internal component being adapted to receive the set of at least one terminal therethrough, the bellows portion having a hollow interior formed therein containing a pressure compensating fluid and an output through which the pressure compensating fluid may flow, the flexible internal component further comprising a fluid channel in fluid communication with the output of the bellows portion and the internal cavity of the flexible internal component, and the internal cavity of the flexible internal component being in fluid communication with the fluid-filled internal cavity of the cable termination device; and wherein the bellows portion is adapted to compress upon experiencing increasing external hydrostatic pressure and to diffuse the pressure compensating fluid through the fluid channel and into the internal cavity of the flexible internal component when compressed to provide a pressure balanced environment within the pressure compensator and cable termination assembly.

2. The inline pressure compensator and cable termination assembly of claim 1, wherein the pressure compensator is adapted to compensate the pressure in an internal cavity of the cable termination assembly to prevent movement of the set of at least one terminal within the cable termination device.

3. The inline pressure compensator and cable termination assembly of claim 1, wherein the bellows portion is further adapted to expand under decreasing external hydrostatic pressure and to diffuse the pressure compensating fluid through the fluid channel into the interior of the bellows portion.

4. The inline pressure compensator and cable termination assembly of claim 1, wherein the bellows portion is made of metallic material and comprises an inner bellows ring and an outer bellows ring that are edge-welded together.

5. The inline pressure compensator and cable termination assembly of claim 1 further comprising, a set of at least one o-ring seal device disposed intermediate the pressure compensator and the cable termination device.

6. The inline pressure compensator and cable termination assembly of claim 1 wherein the exterior housing comprises an annular base at the bottom and the flexible interior component comprises an annular support portion disposed intermediate of the annular base and the end of the cable termination device.

7. The inline pressure compensator and cable termination assembly of claim 1 wherein the bottom of the exterior housing includes a first set of holes and the flexible interior component includes a second set of holes, the first and second sets of holes configured to be aligned when assembled and having dimensions adapted to receive the set of at least one terminal.

8. The inline pressure compensator and cable termination assembly of claim 1 wherein the cable termination device is a receptacle and the inline pressure compensator and cable termination device is adapted to matingly receive a plug, and wherein the set of at least one terminal connects with a corresponding set of at least one terminal in the plug to form a connection.

9. The inline pressure compensator and cable termination assembly of claim 1 wherein the cable termination device is a plug and the inline pressure compensator and cable termination device is adapted to mate with a receptacle, and wherein the set of at least one terminal connects with a corresponding set of at least one terminal in the receptacle to form a connection.

10. A pressure compensator assembly adapted to mount on a cable termination device to form an inline assembly, the pressure compensator assembly comprising:

an internal flexible component comprising a bellows portion;

a rigid external housing adapted to substantially receive therein the bellows portion of the flexible internal component, the rigid external housing and the flexible internal component being adapted to be mounted on a cable termination device at a first end and being co-axial with a cable termination device axis to form an inline assembly;

wherein the rigid external housing comprises a cylindrical body having an open-ended annular top portion, an inner wall, an outer wall, and a bottom, the inner wall and the outer wall being spaced apart and configured along with the top portion and the bottom to form an outer cavity and an inner cavity in the cylindrical body, the outer cavity being adapted to receive and substantially surround the bellows portion of the flexible internal component, the bottom and the inner cavity being adapted to receive a set of at least one terminal of the cable termination device, the outer wall of the body having a set of at least one opening adapted to permit ambient fluid to diffuse through the set of at least one opening and thereby expose the outer cavity and the bellows portion of the flexible internal component to ambient hydrostatic pressure;

wherein the flexible internal component comprises a body portion having an internal cavity formed therein defined by a top and a cylindrical wall, the top being adjacent to the bottom of the rigid external housing and the internal cavity of the flexible internal component being disposed intermediate of the inner cavity of the rigid external housing and the cable termination device, the top and internal cavity of the flexible internal component being adapted to receive the set of at least one terminal therethrough, the bellows portion having a hollow interior formed therein containing a pressure compensating fluid and an output through which the pressure compensating fluid may flow, the flexible internal component further comprising a fluid channel in fluid communication with the output of the bellows portion and the internal cavity of the flexible internal component, and the internal cavity of the flexible internal component being in fluid communication with a cavity formed in the cable termination device; and wherein the bellows portion is adapted to compress upon experiencing increasing external hydrostatic pressure and to diffuse the pressure compensating fluid through the fluid channel and into the internal cavity of the flexible internal component when compressed to provide a pressure balanced environment within the pressure compensator and cable termination assembly.

11. The pressure compensator of claim 10, wherein the pressure compensator is adapted to compensate the pressure in an internal cavity of the cable termination assembly to prevent movement of the set of at least one terminal within the cable termination device.

12. The pressure compensator of claim 10, wherein the bellows portion is further adapted to expand under decreasing external hydrostatic pressure and to diffuse the pressure compensating fluid through the fluid channel into the interior of the bellows portion.

13. The pressure compensator of claim 10, wherein the bellows portion is made of metallic material and comprises an inner bellows ring and an outer bellows ring that are edge-welded together.

14. The pressure compensator of claim 10 further comprising, a set of at least one o-ring seal device disposed intermediate the pressure compensator and the cable termination device.

15. The pressure compensator of claim 10 wherein the exterior housing comprises an annular base at the bottom and the flexible interior component comprises an annular support portion disposed intermediate of the annular base and the end of the cable termination device.

16. The pressure compensator of claim 10 wherein the bottom of the exterior housing includes a first set of holes and the flexible interior component includes a second set of holes, the first and second sets of holes configured to be aligned when assembled and having dimensions adapted to receive the set of at least one terminal.

17. The pressure compensator of claim 10 wherein the cable termination device is a receptacle and the inline pressure compensator and cable termination device is adapted to matingly receive a plug, and wherein the set of at least one terminal connects with a corresponding set of at least one terminal in the plug to form a connection.

18. The pressure compensator of claim 10 wherein the cable termination device is a plug and the inline pressure compensator and cable termination device is adapted to mate with a receptacle, and wherein the set of at least one terminal connects with a corresponding set of at least one terminal in the receptacle to form a connection.

* * * * *